United States Patent [19]

Schmied et al.

[11] Patent Number: 5,632,435
[45] Date of Patent: May 27, 1997

[54] PROCESS FOR THE PRODUCTION OF A SOLDERED JOINT

[75] Inventors: Joachim Schmied, Oberehrendingen; Karl Allenbach, Kollbrunn, both of Switzerland

[73] Assignee: Sulzer-Escher Wyss AG, Winterthur, Switzerland

[21] Appl. No.: 378,666

[22] Filed: Jan. 26, 1995

Related U.S. Application Data

[63] Continuation-in-part of Ser. No. 54,297, Apr. 30, 1993, abandoned.

[30] Foreign Application Priority Data

May 27, 1992 [CH] Switzerland .................. 01724/92

[51] Int. Cl.⁶ ............................................. B23K 1/19
[52] U.S. Cl. .................. 228/121; 228/233.2; 228/235.1
[58] Field of Search ......................... 228/121, 124.5, 228/124.1, 56.3, 246, 252, 233.2, 235.1

[56] References Cited

U.S. PATENT DOCUMENTS

| | | | |
|---|---|---|---|
| 2,835,967 | 5/1958 | Umblia | 228/121 M |
| 3,001,269 | 9/1961 | Moore et al. | 428/633 |
| 3,122,375 | 2/1964 | Greenwald | 277/88 |
| 3,300,852 | 1/1967 | de Bruin | 228/121 M |
| 3,425,116 | 2/1969 | Crooks et al. | 228/121 M |
| 3,767,212 | 10/1973 | Ludwig | 277/25 |
| 3,926,443 | 12/1975 | Fenerty et al. | 277/96.2 |
| 3,957,276 | 5/1976 | Wiese | 277/22 |
| 4,095,005 | 6/1978 | Kishida et al. | 427/454 |
| 4,099,728 | 7/1978 | Wiese | 277/96 |
| 4,212,475 | 7/1980 | Sedy | 277/96.1 |
| 4,228,942 | 10/1980 | Dietrich | 228/121 |
| 4,363,491 | 12/1982 | Secor | 277/81 R |
| 4,562,121 | 12/1985 | Thiemann et al. | 428/607 |
| 4,797,328 | 1/1989 | Boehm et al. | 222/1 |
| 4,850,523 | 7/1989 | Slutz | 228/121 |
| 4,858,817 | 8/1989 | Hwang et al. | 228/121 |
| 4,980,243 | 12/1990 | Malikowski et al. | 428/621 |
| 4,993,917 | 2/1991 | Kulle et al. | 415/105 |
| 5,039,113 | 8/1991 | Gardner | 277/81 R |
| 5,042,824 | 8/1991 | Gardner et al. | 277/81 R |
| 5,071,141 | 12/1991 | Lai et al. | 277/65 |
| 5,074,941 | 12/1991 | Lai et al. | 156/89 |
| 5,080,378 | 1/1992 | Kagawa | 277/96 |
| 5,092,612 | 3/1992 | Victor et al. | 277/96.1 |

FOREIGN PATENT DOCUMENTS

| | | |
|---|---|---|
| 3942408 | 5/1991 | Germany . |
| 19-4059 | 2/1944 | Japan . |
| 56-26779 | 3/1981 | Japan . |
| 1213820 | 11/1970 | United Kingdom . |
| 2029518 | 3/1980 | United Kingdom . |

Primary Examiner—Samuel M. Heinrich
Attorney, Agent, or Firm—Greenblum & Bernstein P.L.C.

[57] ABSTRACT

Process for the production of a soldered joint. The invention pertains to a soldering process in which thin walled carbon parts are soldered, on a flat side, to silicon carbide parts, for the connection of mechanically and thermally highly stressed parts such as supporting and sliding rings that are utilized in dry gas seals, with the use of a pure silver-titanium solder, having a titanium content of 2–6% by weight, in combination with synthetic graphite and a silicon carbide comprised of silicon, silicon carbide and carbon, whose physical properties are well known, it is possible to produce a durable bond, in a vacuum furnace, by means of a predetermined time/temperature program under suitable conditions, which bond is particularly suitable for the noted supporting and sliding rings utilized in dry gas seals.

18 Claims, 3 Drawing Sheets

PROCESS FOR THE PRODUCTION OF A SOLDERED JOINT

CROSS REFERENCE TO RELATED APPLICATIONS

This application is a continuation in part of now abandoned U.S. patent application Ser. No. 08/054,297, filed Apr. 30, 1993, which claims the priorities of Swiss Applications No. 01 724/92-2, filed May 27, 1992 and No. 01 962/92-7, filed Jun. 22, 1992, the disclosures of which is incorporated herein by reference in their entireties.

BACKGROUND OF THE INVENTION

1. Field of the Invention

This invention pertains to a process for the production of a soldered joint between a carbon part or material and a silicon carbide part, particularly the soldering of flat parts that have their greatest thermal expansion in the flat plane in which the solder is also so arranged, for example, as in a sliding ring and a supporting ring in a dry gas seal.

2. Discussion of the Background of the Invention and Material Information

U.S. Pat. No. 5,092,612 to VICTOR describes, in detail, the function of a dry gas seal in which the sliding rings are comprised of silicon carbide, whose frontal face areas can have a protective seal or emergency contact layer of several μm comprised of graphite or polytetrafluoroethylene. The layers are provided in case that the sliding surfaces touch each other in an emergency running situation.

Dry gas seals are dynamic seals in which a load carrying gas cushion is first built up between the running surfaces during the relative movement of the sliding surfaces. During start up and coast down of a shaft, equipped with dry gas seals, there is almost always a very short emergency running situation which leads to a mechanical contact followed by a shock-type of temperature increase of the sliding surfaces. A unitary carbon sliding ring or body, due to the good running/sliding properties of carbon would, in theory, be advantageous, but in actual operating conditions suffers from excessive deformation.

On the other hand, protective layers in the magnitude of several μm have a very short life span since they may generally already be consumed during the run-in period of the sliding ring.

SUMMARY OF THE INVENTION

It is thus the task or object of the invention to unite, via soldering, a flat carbon part with a flat silicon carbide part in a manner such that the dimensional stability of the silicon carbide, due to stiffness and good conductivity as well as due to a low coefficient of expansion, is transferred to the carbon part. This configuration tolerates the jumps in temperature which, for example, occur during the very short dry frictional contacts of the sliding surfaces of dry gas seals.

It is a further object of the invention to produce carbon surfaces or coverings which have a thickness of several tenths of a millimeter, It is still a further object of the invention to produce a soldered joint without the use of copper, in order to avoid corrosion.

It is yet another object of the invention to transfer to a thin-walled carbon part, via the soldered joint, the rigidity of a silicon carbide support body.

It is still another object of the invention to keep the temperature differences, in the solder and the silicon carbide support body, to a minimum, during the soldering process.

These tasks or objects are achieved via a soldering process in a vacuum furnace in which a silver-titanium solder, with a titanium Content in the range of 2–6% by weight, is interposed between a carbon part and silicon carbide part wherein;

- in a first step, a combination, formed of the carbon part, the silicon carbide part and the interposed solder, is heated to a temperature just below, preferably 10° C. below, the melting point of the solder, at a rate of less than 600° C./hour;
- in an optional intermediate step, between the first and second step, the combination is maintained at a holding temperature that is below, preferably 10° C. below, the melting temperature of the solder, until all parts of the combination have reached the holding temperature;
- in a second step, the combination is further heated to the actual melting temperature which, depending on the composition of the solder, is in the range between 1000 and 1050° C., at a rate in the range of 200°–1000° C./hour;
- in a third step, the combination is further heated, at a predetermined soldering temperature, for a soldering time of between 5 and 20 minutes;
- in a fourth step, the combination is cooled, to an intermediate temperature, with the intermediate temperature being below the melting point of the solder, such as for example 650° C., at the rate of less than 200° C./hour; and
- in a fifth step, the combination is further cooled, from the intermediate temperature to ambient temperature, at a rate of less than 400° C./hour.

It has been determined that, for such a soldering process, the combination of a carbon-doped silicon carbide comprised of silicon, silicon carbide and carbon is particularly favorable, in which the solder is interposed as a foil and is retained under a predetermined surface pressure.

This process permits the joining of synthetic graphite and a silicon carbide, composed of silicon, silicon carbide and carbon, via a silver-titanium solder, with a titanium content of 2–6% by weight, even though its coefficient of thermal expansion is five times greater than that of the two materials it joins. However, in order to achieve a usable result, the heating up procedure, the soldering procedure and the cooling procedure must be kept within definite limits.

Slow heating and cooling, below the melting temperature of the solder are enormously important in order to keep the residual or internal stress low. On one hand, above the melting point of the solder, the wetting and diffusion procedures must be held within a defined temperature/time dependence and, on the other hand must still be allowable or fit within the residual/internal stress associated with the temperature rise and fall thereof. Simultaneously with the wetting and the diffusion of the solder, there also occurs a separation or disassociation of the previously finely distributed components which is also controlled by their affinity to the soldering partners in a time and temperature-dependent manner. Therein, not only the chemical composition, but also the pore sizes of the synthetic graphite and the carbon-doped silicon carbide play a role in order to produce the desired junction with a defined time/temperature curve. It has been determined that the solder must have a defined minimum thickness between 0.1 and 1.0 mm at a surface pressure of between 0.4 and 1.0 N/cm$^2$. For large area solder junctions, the carbon and silicon carbide parts must first be outgassed. This must be carried out in a vacuum furnace at up to 1000° C., wherein the parts, upon cooling, can be removed from the vacuum but for a short time in order to prohibit the diffusion therein of gas, prior to the soldering procedure.

An advantage of this process is that it allows the production of dry gas seals having sliding rings of synthetic graphite that are connected, with the soldered joint, with a carrier or support ring of a silicon carbide comprised of silicon, silicon carbide and carbon which, on one hand, due to its own very high heat conductivity, prevents heat accumulations in the silicon ring and, on the other hand, leads to a quick temperature equalization within itself, which, in combination with its low coefficient of thermal expansion, gives it an enormous inherent thermal stability, whereas the high Young's modulus of silicon carbide provides very stiff support. Therein, it is sufficient to fashion the synthetic graphite as a ring, having a thickness of up to 2 mm, in order to have sufficient reserve for run-in and emergency running.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 2:
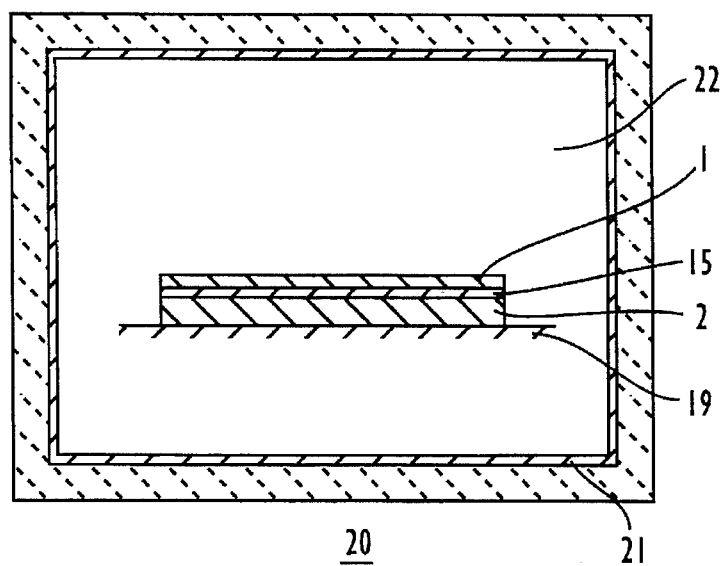
FIG. 2 is a schematic showing of the arrangement of the flat parts to be soldered in a vacuum furnace.

FIG. 2 schematically shows a vacuum furnace 20, having, during the soldering operation, a vacuum 22 in its interior 21 of $10^{-3}$ to $10^{-4}$ Torr.

Figure 1:
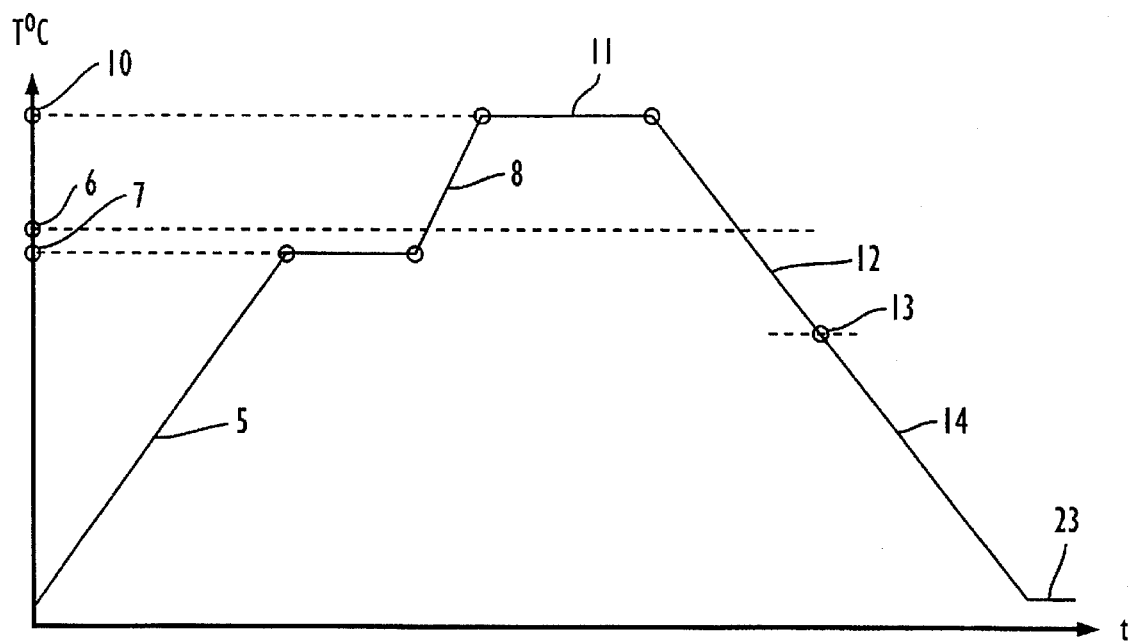
FIG. 1 is a schematic showing of time/temperature development for the soldering in a vacuum furnace.

A support or base 19 has stacked thereupon, for soldering, a silicon carbide part or portion 2, solder 15, preferably as a foil, and a carbon part or portion 1, with the combination thereof being subjected to the time/temperature program that is shown in FIG. 1.

Figure 3:
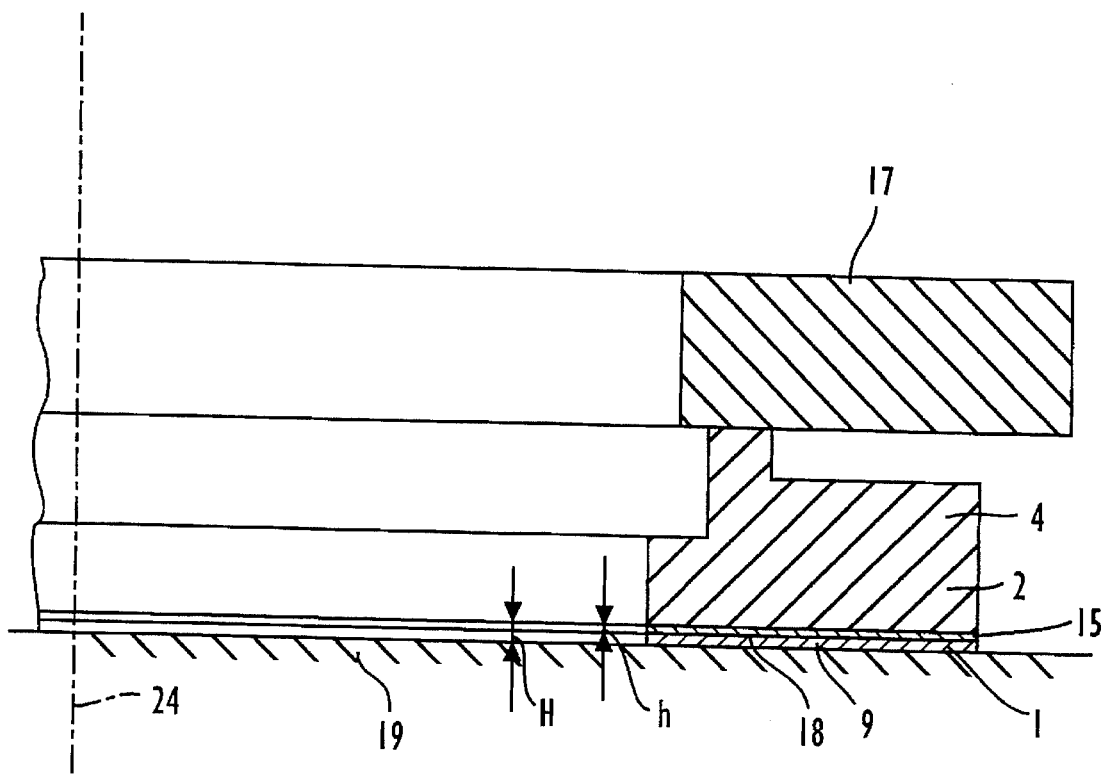
FIG. 3 shows a schematic arrangement, in a vacuum furnace, for connecting a synthetic graphite ring with a silicon carbide support ring of silicon, silicon carbide and carbon, for use as a dry gas seal.

FIG. 3 shows the specific arrangement for the production of a sliding ring 9 for use in a dry gas seal. Support 19 carries a synthetic graphite ring having a height H of 2 man and has the following physical characteristics:

Temperature stability in an oxygen-containing atmosphere, 500° C.;
compressive strength, 100 N/mm$^2$;
Modulus of elasticity, 12,000 N/mm$^2$;
Brinell hardness, HB 25;
Porosity, 10% by volume; and
thermal conductivity, 65 W/m° k.

Material of this type is available under the designation FH42Y3 with the above properties, and a material with slightly differing properties, under the designation FU 2540, also being available from the firm of Schunk Kohlenstofftechnik GmbH, Post Office Box 6420, D-6300 Giessen, Germany. Stacked upon graphite ring 1 (FIG. 3) are two foils of solder 15 having a total thickness h of 0.5 mm and a composition (by weight) of silver/titanium 94/6. The solder foils 15 are restrained, via the weight of the supporting ring 4 and an additional weight 17, in a ring form, at a surface pressure 18 of 0.65 N/cm$^2$. Annular silicon carbide ring 4 is comprised of a silicon, silicon carbide and carbon composition and is wet sanded prior to outgassing in order to open the pores on the soldering surface. Annular support ring 4 and graphite ring 1 were previously outgassed or degasified in that they were heated, in a vacuum of $10^{-3}$ to $10^{-4}$ Torr, at a heating rate of 300°–500° C./hour over 1000° C. and kept at this holding temperature for 15 minutes and subsequently cooled, over a span over several hours (such as overnight) and in a vacuum, to ambient temperature. Silicon carbide supporting ring 4 is comprised of silicon, silicon carbide and carbon having the following properties:

Chemical composition in weight %, <6.5% Si; 15% C as free
carbon; <1% impurities; remainder SiC;
density, 2.9 g/cm$^3$;
porosity, <1% by volume; and
thermal conductivity, 130 W/m° k.

Raw material of this type is available under the designation CarSIK-CT from the already previously-noted Schunk Kohlenstofftechnik GmbH.

The actual soldering process is carried out according to a time/temperature diagram corresponding with the one schematically shown FIG. 1. The previously-noted combination of carbon part 1, silicon carbide part 4 and interposed solder foil 15 is raised, in a first temperature increase 5 at a heating rate of 250°–300° C./hour to a temperature of 950° C. which is 10° C. below the melting temperature of utilized solder 15. At 950° C., as holding temperature 7, this temperature is held for over 15 minutes, in order to assure temperature equalization with the vacuum furnace, with this time being furnace dependent. During a second temperature increase 8, at a heating rate of 300°–400° C./hour, the actual soldering temperature 10 of 1040° C. is achieved which should be controlled to +5° C., Soldering temperature 10 is held, depending on the composition of the solder for a soldering time 11 for 13–15 minutes. Subsequently, cooling is initiated at a rate 12 of 70°–100° C./hour and cooled to an intermediate temperature 13 at 650° C. Further cooling takes place in a vacuum at a cooling rate 14 of 150°–200° C./hour until ambient temperature 23 is reached.

The thus produced sliding ring 9, with support ring 4, would, however not yet fulfill its function in a dry gas seal since, due to the pores therein, insufficient pressure can be built up in the seal gap. Thus, sliding ring 9 must be impregnated, for example, with antimony, in order to fill the pores which play a role during the soldering procedure, as is known to one skilled in this art.

Carbon enhanced or doped silicon carbide has been determined to be particularly useful since its thermal capacity is substantially greater than that of steel and its co-efficient of thermal expansion is substantially less than that of steel and it has a sufficiently high modulus of elasticity with corresponding greater hardness. In comparison with pure silicon carbide or silicon/silicon carbide compounds, the carbon enhanced silicon carbide is particularly readily solderable with a carbon layer where, between the solder the carbon enhanced silicon carbide on one side, and a carbon layer on the other side, a particularly intimate and robust structural connection is achieved through alloying or diffusing or chemical coupling which can absorb such stresses so that even during extreme operating conditions, the sliding surface will not separate from the annular body.

A suitable solder is silver-titanium solder with a titanium content of about 2–6% by weight which requires a soldering temperature of approximately 1050° centigrade.

Figure 4:
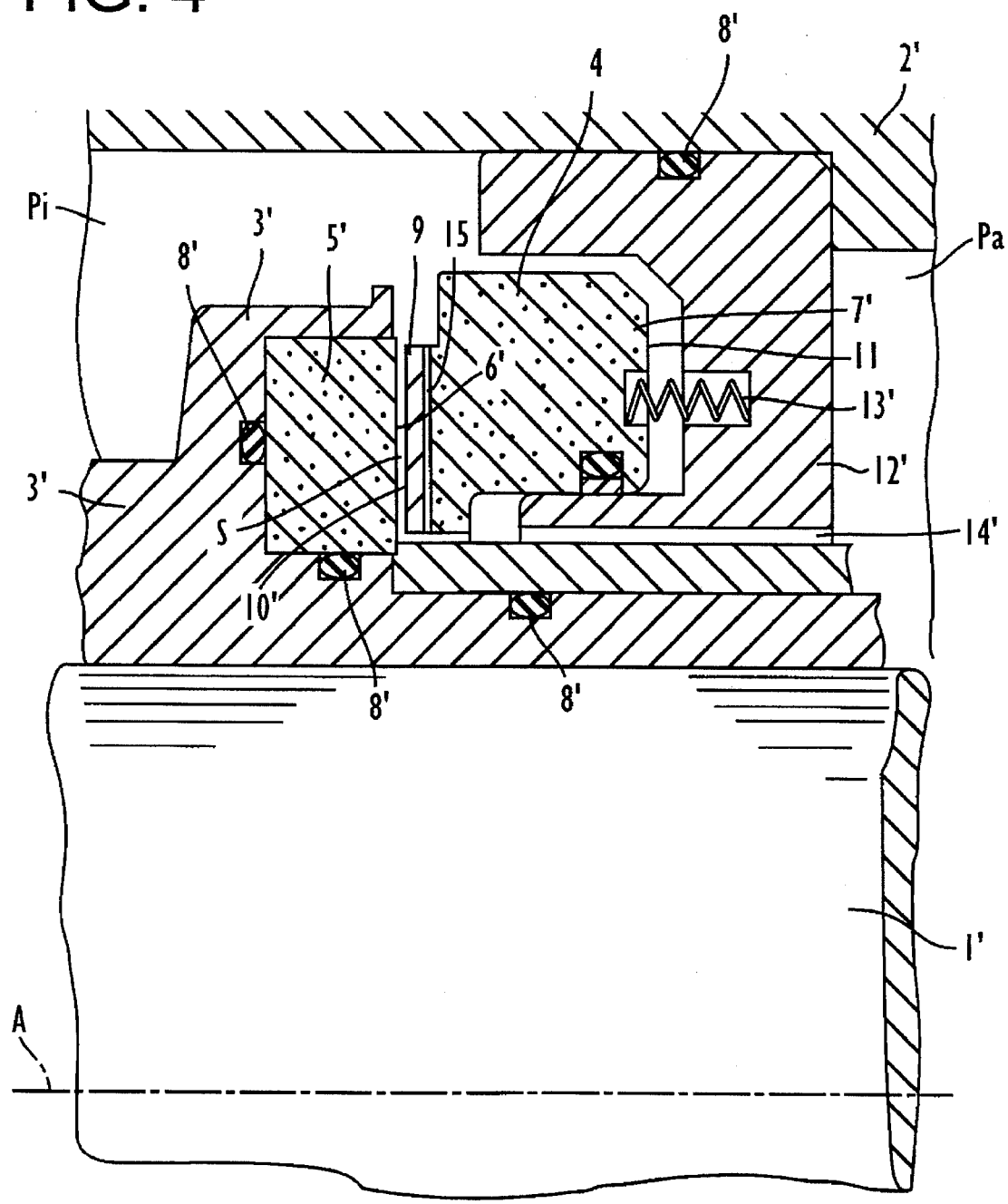
FIG. 4 is a schematic showing of an installed dry gas seal having a sliding ring produced with the process of this invention.

In the example illustrated in FIG. 4, a shaft 1' extends sealingly through a housing wall 2', for example in a turbo machine from a higher pressure area $P_i$ to an area of lower pressure $P_a$. The seal includes a shaft sleeve or shaft bushing 3' surrounding shaft 1', that carries a sealing body 5' on its outer side which in turn on its outer side forms an annular shaped sealing surface 6'. Preferably, sealing body 5' is formed of hard metal or hard alloy for example of silicon carbide or other materials with similar anti-friction properties. For sealing of the higher inner pressure $P_i$ one or more 0-ring shaped seals 8' are utilized in grooves in the shaft sleeve 3' between shaft sleeve 3' and sealing body 5'.

In the bore of housing wall 2', which permits the extension therethrough of the shaft, a joint/seal holder 12' is carried which forms a portion of housing wall 2' and which carries a stationary, that is non-rotational, sliding or friction ring 7', but which is somewhat moveable axially and which carries a sliding body 9 of carbon with a graphite structure attached to the sliding surface 10', facing sealing surface 6', of sealing body 5'.

Through inner pressure $p_i$ the rear surface of sliding ring 11', of seal holder 12', augmented via spring 13', is pressed against sealing body 5'. At the same time, in the seal clearance S between sealing body 5' and sliding body 9', a gas film of several micrometers in thickness is formed by an introduced gas which results in a non-contacting seal. Thus, the lubrication of the sliding surfaces can be accomplished, in a known manner, for example aerodynamically via pockets, grooves, or in the sliding surface of the sealing surface or aerostatically with the introduction of gas through the sliding body therethrough to the sliding surface. The gas leakage occurring through the seal clearance and the several sealing rings is channeled to the outside via a conduit 14'.

The sliding ring 7' is comprised of an annular body 4 of a material having a modulus of elasticity similar to that of steel but with a greater heat conductivity than steel and a smaller co-efficient of thermal expansion than steel so that the temperature gradients in annular body 4, in view of the heat generated in the seal clearance, are particularly low. Together with the low co-efficient of thermal expansion, this has the effect of relatively minor deformations of annular body 4.

The carbon sliding body 9' is firmly and intimately connected with annular body 4 via a soldered joint 15 which will not loosen even during extreme operating conditions.

Particularly well suited and useful for the formation of annular body 4 is a sintered carbide material, for example, silicon carbide, when it is soldered to a sliding body of carbon.

A particularly rigid soldered joint can be obtained with materials which enter into an intimate structural combination with the solder which, in comparison to cementing or bonding, by reason of the thus formed material structure, have a greater stiffness. Particularly well suited is the embodiment of annular body 4 of carbon enhanced silicon carbide which is especially effectively combined with a suitable solder for example, of silver-titanium type solder with a titanium content of about 2–6% by weight and a soldering temperature of about 1050° Centigrade, which permits nearly indissoluble combinations with sliding body 9. The solder intermediate layer 15, formed in the soldering together of inner body 4 and sliding body 9, is suitably soft to enable it to absorb the heat stresses and deformations without letting the parts separate from each other.

With use of the described materials, a dry running gas seal can be produced, which under extreme operating conditions, permits no unacceptable deformations and therefore provides increased safety of operation and a greater degree of utilization.

It is of advantage that sliding body 9 and annular body 4 have similar co-efficients of thermal expansion. This leads to particularly minor relative heat expansions between the sliding body and the sealing body during the soldering process even at the high temperatures required therefore.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A process for the production of a soldered joint between a carbon part, comprising no diamond structures, and a silicon carbide part, via a silver-titanium solder, having a titanium content in the range of 2–6% by weight, wherein the solder is interposed between the carbon part and the silicon part in a vacuum furnace, the process comprising:

heating in a first step, a combination, formed of the carbon part, the silicon carbide part and the interposed solder, to a temperature just below the melting temperature of the solder, at a rate of less than 600° C./hour;

further heating, in a second step, the combination to the actual melting temperature of the solder which, depending on the composition of the solder, is in the range between 1000 and 1050° C., at a rate in the range of 200°–1000° C./hour;

further maintaining, in a third step, the combination, at a predetermined soldering temperature between 1000 and 1050° C. for a soldering time between 5 and 20 minutes;

cooling, in a fourth step, the combination, to an intermediate temperature, with the intermediate temperature being below the melting temperature of the solder, at a rate of less than 200° C./hour; and further cooling, in a fifth step, the combination from the intermediate temperature to ambient temperature, at a rate of less than 400° C./hour.

2. The process of claim 1 further including, maintaining, in an optional intermediate step, between the first and second steps, the combination at a holding temperature that is below the melting temperature of the solder, until the entire combination has reached the holding temperature.

3. The process of claim 2 wherein the holding temperature is about 10° C. below the melting temperature of the solder.

4. The process of claim 1 wherein said intermediate temperature is about 650° C.

5. The process of claim 1 further including outgassing the carbon and silicon carbide parts in a preliminary step, prior to the first step.

6. The process of claim 5 including heating the carbon and silicon carbide parts in a vacuum furnace and thereafter cooling same in a vacuum.

7. The process of claim 1 further including interposing the solder between the carbon and silicon carbide parts, in the form of at least one foil, wherein the foil has a thickness in the range of 0.1 to 1.0 mm.

8. The process of claim 7 further including the step of maintaining the solder under a surface pressure in the range of 0.4 to 1.0N/cm$^2$.

9. The process of claim 1 wherein the carbon part is comprised of synthetic graphite.

10. The process of claim 9 wherein the synthetic graphite has the following properties:

Temperature stability in an oxygen-containing atmosphere, 500° C.;

Modulus of elasticity, 12,000N/mm$^2$;

Brinell hardness, HB 25;

porosity, 10% by volume; and thermal conductivity, 65 W/m° k.

11. The process of claim 1 wherein the silicon carbide is comprised of a carbon-doped silicon carbide.

12. The process of claim 11 wherein the silicon carbide is comprised of a silicon, silicon carbide, carbon composition.

13. The process of claim 12 wherein the silicon, silicon carbide, carbon composition has the following properties:

a chemical composition, in % weight of <6.5% Si, 15% C in the form of free carbon, <1% impurities, with the remainder consisting of SiC;

a density of 2.9 g/cm$^3$;

a porosity of <1% by volume; and a thermal conductivity of 130 Watts/m° k.

14. A process for the production of a soldered joint between a carbon part and a silicon carbide part, via a silver-titanium solder, having a titanium content in the range of 2–6% by weight, wherein the solder is interposed between the carbon part and the silicon part in a vacuum furnace, the process comprising:

heating in a first step, a combination, formed of the carbon part, the silicon carbide part and the interposed solder, to a temperature just below the melting temperature of the solder, at a rate of less than 600° C./hour;

further heating, in a second step, the combination to the actual melting temperature of the solder which, depending on the composition of the solder, is in the range between 1000° and 1050° C., at a rate in the range of 200–1000° C./hour;

further maintaining, in a third step, the combination, at a predetermined soldering temperature between 1000° and 1050° C. for a soldering time between 5 and 20 minutes;

cooling, in a fourth step, the combination, to an intermediate temperature, with the intermediate temperature being below the melting temperature of the solder, at a rate of less than 200° C./hour; and further cooling, in a fifth step, the combination from the intermediate temperature to ambient temperature, at a rate of less than 400° C./hour, wherein the carbon part is comprised of synthetic graphite.

15. The process of claim 14 wherein the synthetic graphite comprises:

a temperature stability in an oxygen-containing atmosphere of 500° C.;

a modulus of elasticity of 12,000N/mm$^2$;

a Brinell hardness of HB 25;

a porosity of 10% by volume; and a thermal conductivity of 65 W/m° k.

16. A process for the production of a soldered joint between a carbon part and a silicon carbide part, via a silver-titanium solder, having a titanium content in the range of 2–6% by weight, wherein the solder is interposed between the carbon part and the silicon part in a vacuum furnace, the process comprising:

heating in a first step, a combination, formed of the carbon part, the silicon carbide part and the interposed solder, to a temperature just below the melting temperature of the solder, at a rate of less than 600° C./hour;

further heating, in a second step, the combination to the actual melting temperature of the solder which, depending on the composition of the solder, is in the range between 1000° and 1050° C., at a rate in the range of 200–1000° C./hour;

further maintaining, in a third step, the combination, at a predetermined soldering temperature between 1000° and 1050° C. for a soldering time between 5 and 20 minutes;

cooling, in a fourth step, the combination, to an intermediate temperature, with the intermediate temperature being below the melting temperature of the solder, at a rate of less than 200° C./hour;

further cooling, in a fifth step, the combination from the intermediate temperature to ambient temperature, at a rate of less than 400° C./hour, wherein the silicon carbide is comprised of a carbon-doped silicon carbide.

17. The process of claim 16, wherein the silicon carbide is comprised of a silicon, silicon carbide, carbon composition.

18. The process of claim 17, wherein the silicon, silicon carbide, carbon composition comprises:

a chemical composition, in % weight of <6.5% Si, 15% C in the form of free carbon, <1% impurities, with the remainder consisting of SiC;

a density of 2.9 g/cm$^3$;

a porosity of <1% by volume; and a thermal conductivity of 130 Watts/m° k.

* * * * *